(12) United States Patent
Fan

(10) Patent No.: US 11,375,002 B2
(45) Date of Patent: Jun. 28, 2022

(54) APPLICATION VERSION SWITCHING METHOD AND APPARATUS, ELECTRONIC DEVICE AND STORAGE MEDIUM

(71) Applicant: BOE TECHNOLOGY GROUP CO., LTD., Beijing (CN)

(72) Inventor: Lin Fan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/040,786

(22) PCT Filed: Apr. 16, 2020

(86) PCT No.: PCT/CN2020/085108
§ 371 (c)(1),
(2) Date: Sep. 23, 2020

(87) PCT Pub. No.: WO2020/224410
PCT Pub. Date: Nov. 12, 2020

(65) Prior Publication Data
US 2021/0160305 A1    May 27, 2021

(30) Foreign Application Priority Data

May 9, 2019    (CN) .......................... 201910384935.7

(51) Int. Cl.
*G06F 9/445*    (2018.01)
*G06F 3/06*    (2006.01)
(Continued)

(52) U.S. Cl.
CPC ............... *H04L 67/06* (2013.01); *G06F 8/71* (2013.01); *H04L 67/1097* (2013.01); *H04L 67/34* (2013.01)

(58) Field of Classification Search
None
See application file for complete search history.

(56) References Cited

U.S. PATENT DOCUMENTS 7,266,817 B1 *  9/2007  Barrett ...................... G06F 8/71
                                                            717/120
8,024,712 B1 *  9/2011  Korolev .............. G06F 11/3476
                                                            717/127
(Continued)

FOREIGN PATENT DOCUMENTS

CN    103647986 A    3/2014
CN    104679544 A    6/2015
(Continued)

OTHER PUBLICATIONS

First Office Action dated Feb. 9, 2021, relating to CN Patent Application No. 201910384935.7.
(Continued)

*Primary Examiner* — Nicholas R Taylor
*Assistant Examiner* — Ho T Shiu
(74) *Attorney, Agent, or Firm* — Dinsmore & Shohl LLP

(57) ABSTRACT

The present disclosure relates to an application version switching method comprising: creating storage paths for at least two versions of an application; creating a first link file for a currently used version of the application, wherein the first link file points to a storage path for the currently used version of the application; acquiring an application version switching instruction; and if a storage path for a target switching version of the application exists, deleting the first link file, and creating a second link file for the target switching version of the application, wherein the second link file points to the storage path for the target switching version of the application. The present disclosure also relates to an application version switching apparatus, an electronic device and a storage medium.

8 Claims, 4 Drawing Sheets

(51) Int. Cl.
*G06F 9/44* (2018.01)
*H04L 67/06* (2022.01)
*G06F 8/71* (2018.01)
*H04L 67/1097* (2022.01)
*H04L 67/00* (2022.01)

(56) References Cited

U.S. PATENT DOCUMENTS

| | | | |
|---|---|---|---|
| 2008/0104081 A1* | 5/2008 | Mimatsu | G06F 16/10 |
| 2010/0043015 A1* | 2/2010 | McClements | G06F 9/44505 |
| | | | 719/316 |
| 2016/0092197 A1* | 3/2016 | Kuchibhotla | G06F 8/71 |
| | | | 717/170 |
| 2018/0052678 A1 | 2/2018 | Chigurapati et al. | |

FOREIGN PATENT DOCUMENTS

| | | |
|---|---|---|
| CN | 104778099 A | 7/2015 |
| CN | 107656740 A | 2/2018 |
| CN | 108536490 A | 9/2018 |
| CN | 109508198 A | 3/2019 |
| CN | 110096306 A | 8/2019 |

OTHER PUBLICATIONS

"How jenkin implements web version control & fallback", https://www.cnblogs com/mhl1003/p/9492966.html, Aug. 17, 2018.

* cited by examiner

APPLICATION VERSION SWITCHING METHOD AND APPARATUS, ELECTRONIC DEVICE AND STORAGE MEDIUM

CROSS-REFERENCE TO RELATED APPLICATIONS

This application is a U.S. National Stage Application under 35 U.S.C. § 371 of International Patent Application No. PCT/CN2020/085108, filed on Apr. 16, 2020, which claims the priority to the Chinese patent application No. 201910384935.7 filed on May 9, 2019, the disclosures of which are hereby incorporated by reference in their entirety.

TECHNICAL FIELD

The present disclosure relates to an application version switching method and apparatus, an electronic device and a storage medium.

BACKGROUND

In the process of running of actual application systems in the prior art, a very high load occurs in the input/output (I/O) of the server file system, so that a large number of file operations cannot be performed. Accordingly, how to quickly perform application system version rollback becomes one of outstanding problems in the prior art.

SUMMARY

Based on the above objective, some embodiments of the present disclosure provide an application version switching method, comprising:
creating storage paths for at least two versions of an application;
creating a first link file for a currently used version of the application, wherein the first link file points to a storage path for the currently used version of the application;
acquiring an application version switching instruction; and
if a storage path for a target switching version of the application exists, deleting the first link file, and creating a second link file for the target switching version of the application, wherein the second link file points to the storage path for the target switching version of the application.

According to some embodiments of the present disclosure, at least one of the first link file and the second link file is a soft link file.

According to some embodiments of the present disclosure, the application version switching method further comprises:
creating a storage path for each of the versions of the application by means of an application name plus a version identification, respectively.

According to some embodiments of the present disclosure, the application version switching method further comprises:
naming the first link file or the second link file with the application name, wherein a name of the first link file or the second link file is a storage path for the first link file or the second link file.

According to some embodiments of the present disclosure, the application version switching method further comprises:
correspondingly storing an executable program related to the application and a configuration file required by running the application, in the storage path for each of the versions of the application.

According to some embodiments of the present disclosure, the application version switching method further comprises:
establishing, in a process of developing the application, a correspondence between the configuration file and a relative path, wherein the relative path is a storage path for the first link file or the second link file.

According to some embodiments of the present disclosure, in a process of running the application, a storage path for a log generated by the application is the relative path.

Some embodiments of the present disclosure provide an application version switching apparatus, comprising:
an application path creating circuit configured to create storage paths for at least two versions of an application;
an instruction acquiring circuit configured to acquire an application version switching instruction; and a link file creating circuit configured to create a first link file for a currently used version of the application, wherein the first link file points to a storage path for the currently used version of the application; and if a storage path for a target switching version of the application exists, delete the first link file, and create a second link file for the target switching version of the application, wherein the second link file points to the storage path for the target switching version of the application.

According to some embodiments of the present disclosure, at least one of the first link file and the second link file is a soft link file.

According to some embodiments of the present disclosure, the application path creating circuit is configured to create a storage path for each of the versions of the application by means of an application name plus a version identification, respectively.

According to some embodiments of the present disclosure, the link file creating circuit is configured to name the first link file or the second link file with the application name, wherein a name of the first link file or the second link file is a storage path for the first link file or the second link file.

According to some embodiments of the present disclosure, the application version switching apparatus further comprises: a file storage circuit configured to correspondingly store an executable program related to the application and a configuration file required by running the application, in the storage path for each of the versions of the application.

According to some embodiments of the present disclosure, the application version switching apparatus further comprises: a path correspondence establishing circuit configured to establish, in a process of developing the application, a correspondence between the configuration file and a relative path, wherein the relative path is a storage path for the first link file or the second link file.

According to some embodiments of the present disclosure, in a process of running the application, a storage path for a log generated by the application is the relative path.

Some embodiments of the present disclosure provide an electronic device, comprising:
at least one processor; and
a memory communicatively coupled to the at least one processor; wherein,
the memory stores instructions executable by the at least one processor, the instructions, when executed by the at least one processor, cause the at least one processor to perform:

creating storage paths for at least two versions of an application;

creating a first link file for a currently used version of the application, wherein the first link file points to a storage path for the currently used version of the application;

acquiring an application version switching instruction; and if a storage path for a target switching version of the application exists, deleting the first link file, and creating a second link file for the target switching version of the application, wherein the second link file points to the storage path for the target switching version of the application.

Some embodiments of the present disclosure provide a computer readable storage medium having a computer program stored thereon, wherein the computer program, when executed by a processor, performs:

creating storage paths for at least two versions of an application;

creating a first link file for a currently used version of the application, wherein the first link file points to a storage path for the currently used version of the application;

acquiring an application version switching instruction; and if a storage path for a target switching version of the application exists, deleting the first link file, and creating a second link file for the target switching version of the application, wherein the second link file points to the storage path for the target switching version of the application.

BRIEF DESCRIPTION OF THE DRAWINGS

To describe the technical solutions in the embodiments of the present disclosure more clearly, the accompanying drawings used in the embodiments are briefly introduced in the following. Obviously, the accompanying drawings in the following description involves only some embodiments of the present disclosure, and do not limit the present disclosure.

DETAILED DESCRIPTION

Figure 1:
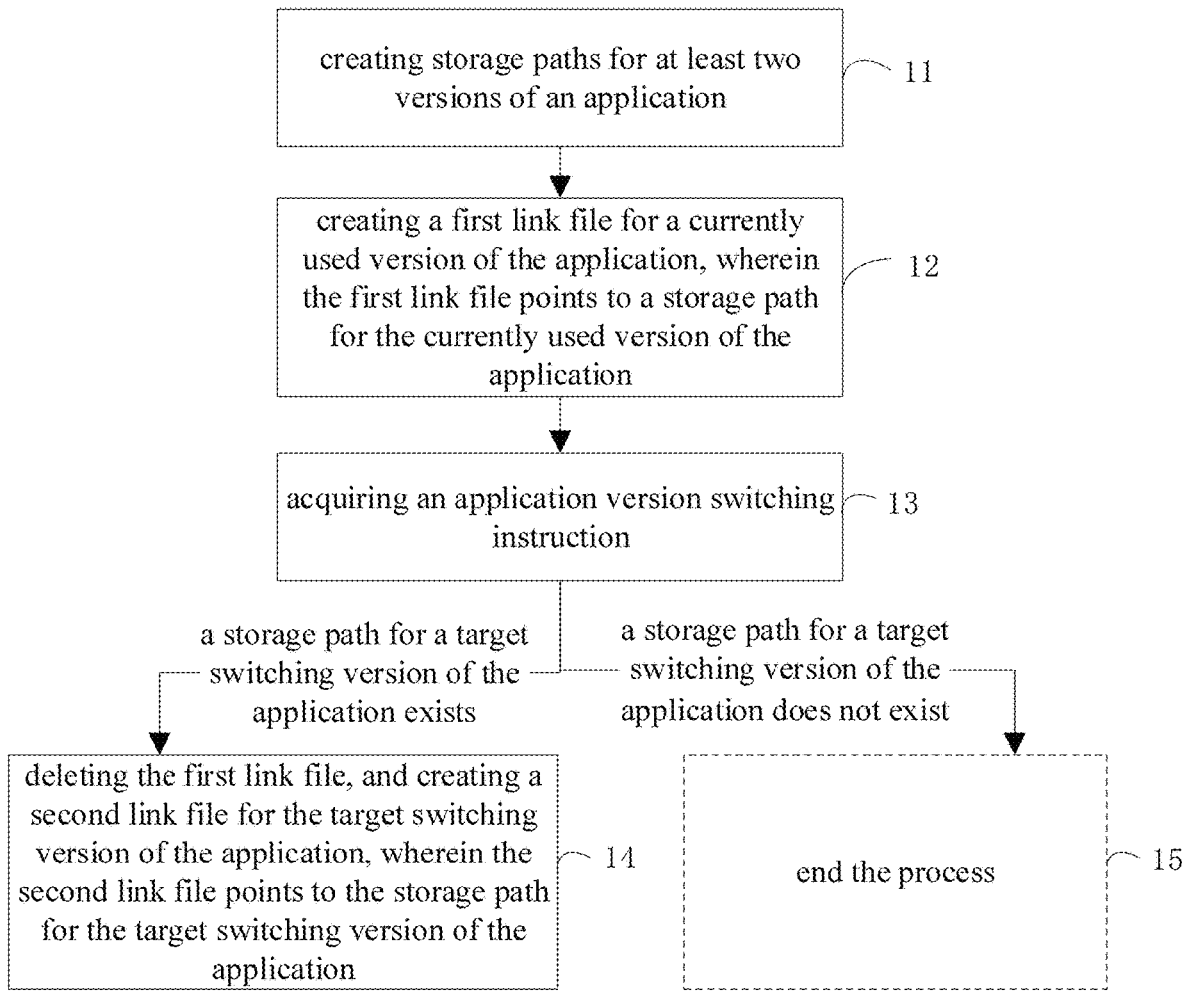
FIG. 1 is a schematic flowchart of an application version switching method provided according to an embodiment of the present disclosure.

In order to make the objectives, technical solutions, and advantages of the embodiments of the present disclosure clearer, the technical solutions in the embodiments of the present disclosure are clearly and completely described in the following with reference to the accompanying drawings in the embodiments of the present disclosure. Obviously, the embodiments in the following description are only a part rather than all of the embodiments of the present disclosure. Based on the described embodiments of the present disclosure, all other embodiments obtained by persons of ordinary skill in the art without creative efforts shall fall within the protection scope of the present disclosure.

Unless defined otherwise, technical or scientific terms used herein shall have the ordinary meanings as understood by one of ordinary skill in the art to which this disclosure pertains. The words "first", "second" or the like used in the present disclosure do not imply any sequence, number or importance, but are merely used to distinguish different components. Also, the use of the words "a", "an" or "the" or the like do not imply a limitation of quantity, but rather imply the presence of at least one. The word "comprise" or "include" or the like means that an element or object preceding the word covers elements or objects and equivalents thereof listed following the word, but does not preclude the possibility of covering also other elements or objects. The words "connected" or "coupled" or the like are not restricted to physical or mechanical connections, but may include electrical connections, either direct or indirect. The words "up", "down", "left", "right" or the like are merely used for implying relative position relations, and after an absolute position of the object described changes, the relative position relation may possibly change correspondingly.

One of the objectives of the embodiments of the present disclosure is to provide an application version switching method and apparatus, an electronic device, and a storage medium, which can address the problem of efficiency in the switching of the application version to a certain extent.

According to the application version switching method and apparatus, the electronic device and the storage medium provided by the embodiments of the present disclosure, by creating a storage path for each of the versions of an application, at the time of version switching, it is only needed to create a new link file to point to a storage path for the target switching version of the application, so as to quickly switch the version of the application; even if the server is in a high concurrency status and the I/O load is very high, a quick millisecond-level application version rollback can be performed; it is not limited by rollback frequency and time point, and it can be rolled back to any version at any time for multiple times.

Some embodiments of the present disclosure provide an application version switching method, which can address the problem of efficiency in the switching of the application version to a certain extent.

As shown in FIG. 1, the application version switching method comprises:

step 11: creating storage paths for at least two versions of an application.

Figure 2A:
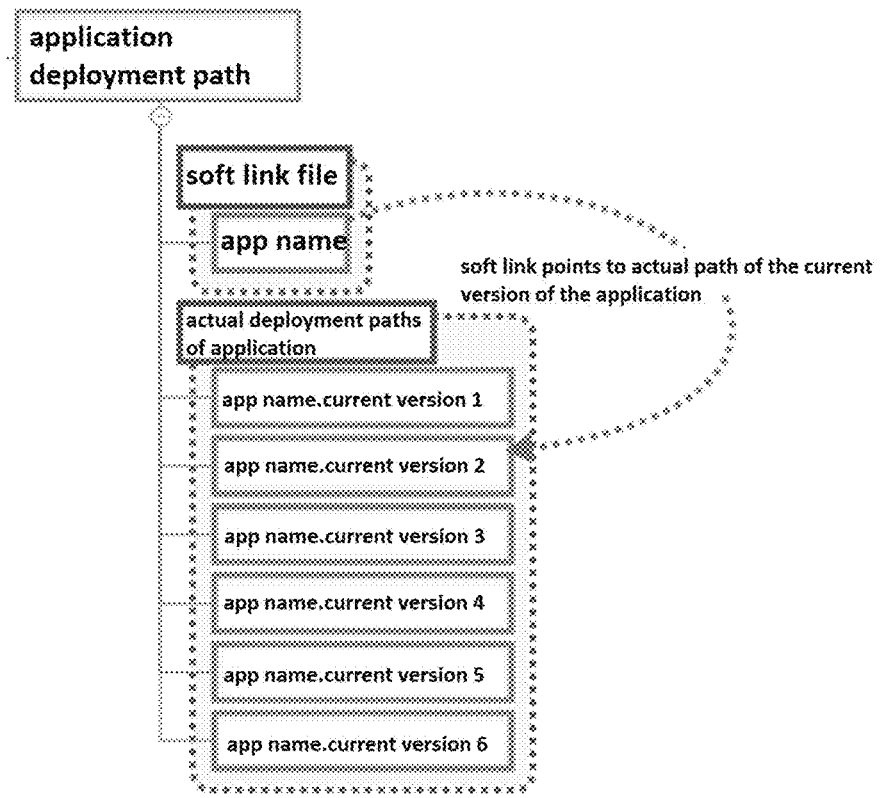
FIG. 2A is a schematic diagram illustrating link file pointing in an embodiment of the present disclosure.

When an application is deployed, it is needed to prepare preconditions for application version switching; for example, history version files of the application and their storage paths are not deleted and modified in the process of application deployment, but remain as they are (as shown in FIG. 2A).

It is needed to create a storage path for each of the versions of the application, respectively. For example, two versions of the application are version 1.0 and version 2.0, respectively, wherein the version 2.0 is a newer version; at this time, storage paths are created respectively for the two versions of the application, which are used for storing files related to the respective versions of the application, respectively.

According to some embodiments of the present disclosure, the application version switching method further comprises: creating respectively a storage path for each of the versions of the application by means of an application name plus a version identification, e.g., "application name"."version number". Assuming that the application name is ABC, the storage paths for the aforementioned two versions of the application are ABC.1.0 and ABC.2.0, respectively. By creating the storage paths in this way, the identifying of the path at the time of version switching can be facilitated.

Step 12: creating a first link file for a currently used version of the application, wherein the first link file points to a storage path for the currently used version of the application.

Assuming that the currently used version of the application is the version 2.0 of the ABC application, the storage path pointed to by the first link file is ABC.2.0. At this time, the currently used version of the application, when working, accesses ABC.2.0 by accessing the first link file.

Step 13: acquiring an application version switching instruction. According to some embodiments of the present disclosure, the application version switching instruction may be to switch a new version to an old version, or may be to switch an old version to a new version. Here, the new version and the old version are relative, and can be determined according to online time of different versions.

Step 14: if a storage path for a target switching version of the application exists, which means that a storage path had ever been created for the target switching version of the application and the storage path had stored therein the related files required by the target switching version of the application, then deleting the first link file, and creating a second link file for the target switching version of the application, wherein the second link file points to the storage path for the target switching version of the application.

Here, assuming that the target switching version of the application is the version 1.0 of the ABC application, the storage path pointed to by the second link file is ABC.1.0. At this time, the target switching version of the application, when working, accesses ABC.1.0 by accessing the second link file.

It should be noted that, for the same application, only one link file exists at a certain timing, that is, when the application is used, the related files in the storage path for the corresponding version of the application can be accessed by accessing the link file. According to some embodiments of the present disclosure, the application version switching method further comprises: naming the first link file or the second link file with the application name, wherein a name of the first link file or the second link file is the storage path for the first link file or the second link file. In this way, by naming the first link file or the second link file with the application name, the calling of the related files of the application is facilitated.

Furthermore, each of the link files only has one pointing, which corresponds to the storage path for the currently used version of the application. If it is necessary to switch the version, it is necessary to delete the original link file and then to create a new link file, and to modify the pointing of the new link file into the storage path for the target switching version of the application. In this way, in the subsequent use of the application, by accessing the new link file (its actual storage path and name are not changed, but only its content (i.e., the pointing) is changed into the storage path for the target switching version of the application), it can be changed to access the storage path for the target switching version of the application, instead of the storage path for the previous version of the application.

According to some embodiments of the present disclosure, the method further comprising step 15: if the storage path for the target switching version of the application does not exist, which means that the target switching version of the application does not exist, then the process is ended.

It can be seen from the above embodiments that, according to the application version switching method provided by the embodiments of the present disclosure, by creating a storage path for each of versions of an application, at the time of version switching, it is only needed to create a new link file to point to a storage path for the target switching version of the application, so as to quickly switch the version of the application; even if the server is in a high concurrency status and the I/O load is very high, a quick millisecond-level application version rollback can be performed; it is not limited by rollback frequency and time point, and it can be rolled back to any version at any time for multiple times.

According to some embodiments of the present disclosure, at least one of the first link file and the second link file is a soft link file, which may be created by using an ln-s command. The soft link is also called symbolic link, this file contains a pathname of another file, wherein the pathname may be any file or directory, and may link files of different file systems. The soft link file is only a label of its source file. When the source file is deleted, the soft link file cannot exist independently, and the content of the soft link file cannot be viewed although a file name of the soft link file is still reserved. Due to the aforementioned characteristics of the soft link file, the pointing of the application version can be realized by using the soft link file. In this way, the daily operation of the application can be supported by creating the soft link, and meanwhile, the switching of the application version can be performed by changing the pointing path of the soft link file, thereby achieving the effect of quickly switching the application version.

It should be noted that the link file may also be created by using a hard link. It has the advantage that: as viewed from the process, it can also achieve rollback of any version and has a neat interface; and it has the disadvantage that: the hard link mode requires the use of disk I/O, so that quick rollback cannot be achieved in a status of the high concurrency and the high system I/O.

A specific example of the application version switching method is described below.

Figure 2B:
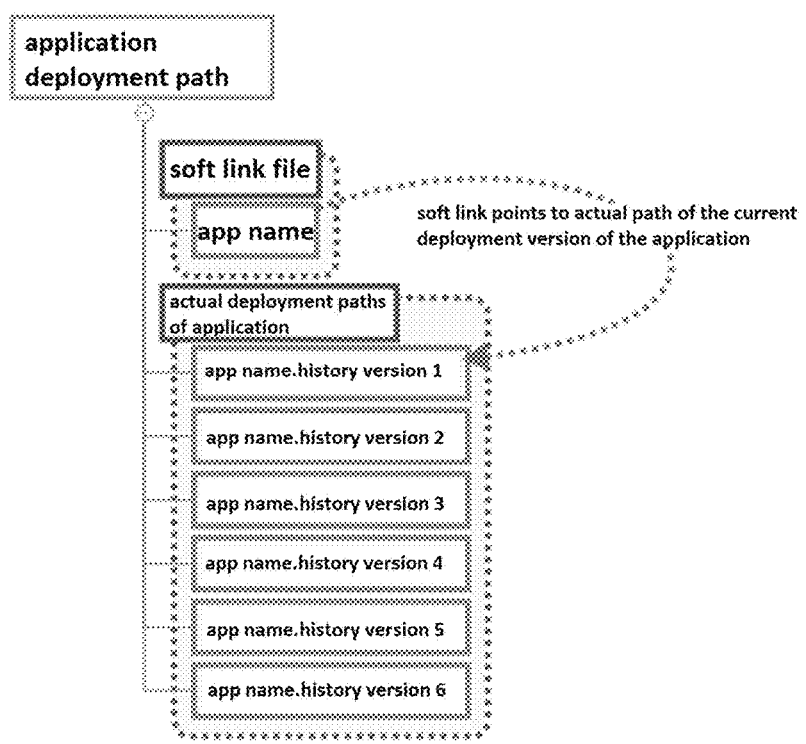
FIG. 2B is another schematic diagram illustrating the link file pointing in an embodiment of the present disclosure.

FIG. 2A illustrates a storage path corresponding to a version of the application currently pointed to by a link file. At this time, the latest version of the application is online, so it is needed to switch the version of the application to the latest version. The original link file is then deleted, and a new link file is recreated that points to an actual path of the latest version, as shown in FIG. 2B.

Figure 2C:
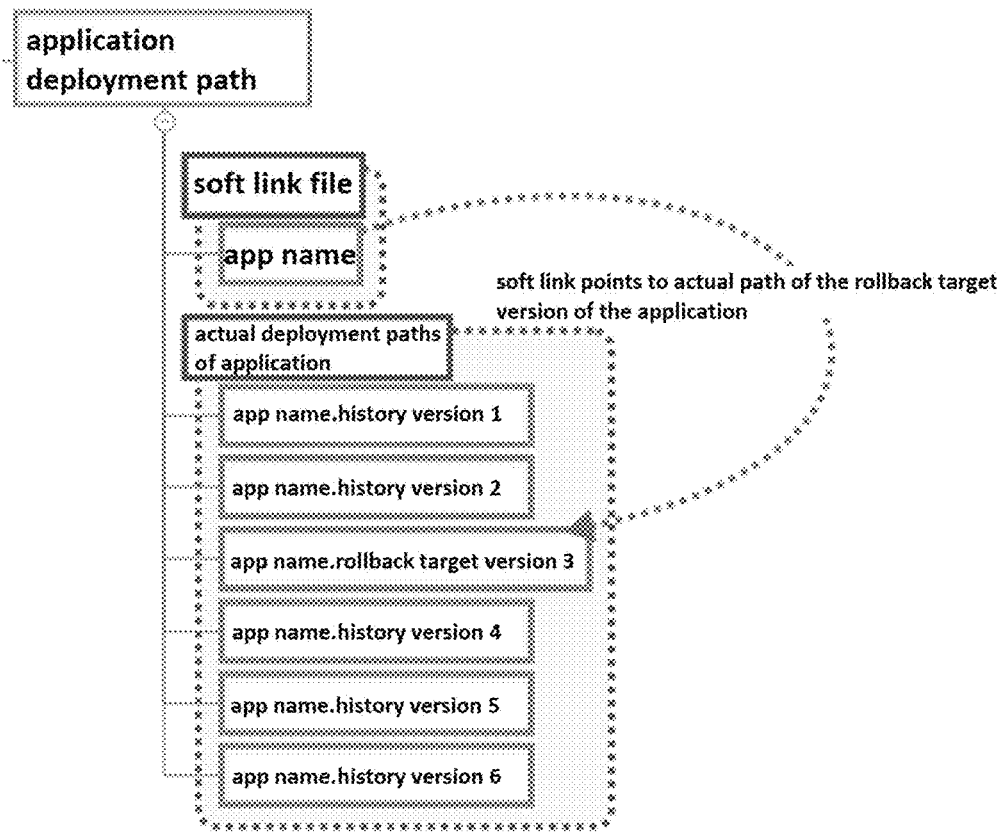
FIG. 2C is a further schematic diagram illustrating the link file pointing in an embodiment of the present disclosure.

When it is necessary to switch the currently used version of the application to an older version of the application, in the same way, the original link file is deleted, and a new link file is recreated that points to an actual path of the target version, as shown in FIG. 2C.

According to some embodiments of the present disclosure, after the version switching is completed, it can be further confirmed from the file system that the current actual path of the link file points to the target version path. The file system herein can refer to a file system of a Unix/Linux operating system; the confirmation herein may be completed by performing an operation using a system file system command such as cd, ll or the like, and then reviewing content returned by the system.

According to some embodiments of the present disclosure, the application version switching method further comprises:

correspondingly storing an executable program related to the application and a configuration file required by running the application, in the storage path for each of the versions of the application.

Through the above embodiment, an organization mode of the application and the configuration file is designed when the application system is deployed, and preparation steps required in the coding and deploying process of the application for achieving quick switching are designed.

According to some embodiments of the present disclosure, the application version switching method further comprises:

establishing, in a process of developing the application, a correspondence between the configuration file and a relative path, wherein the relative path is a storage path for the first link file or the second link file.

Through the above embodiment, the configuration file is called by using the relative path in the process of the application development, so that the configuration file required by the application can be correctly requested no matter the application is deployed in any directory in the process of running the application program.

According to some embodiments of the present disclosure, in the process of running the application, a storage path for a log generated by the application is the relative path.

Through the above embodiment, the path for the log generated in the process of running the application is configured to be the relative path represented by the link file, so that the log data generated by the running of the application can be output into the directory of the currently used version of the application.

According to some embodiments of the present disclosure, the application version switching method is applied to the Unix/Linux system file system, specifically, to the control of an entry of a file directory by the Unix/Linux operating system.

The application version switching method provided by the embodiments of the present disclosure designs an organization mode of the application program and the configuration file when an application system is deployed, designs preparation steps required in the coding and deploying process of the application for achieving quick switching, and achieves the effect of quickly switching the application system by changing an absolute path pointed to by the link file, on the premise that the quick version switching is satisfied.

In the process of running actual application systems in the prior art, a very high load occurs in the input/output (I/O) of the server file system, so that a large number of file operations cannot be performed. In view of the problem of how to quickly perform application system version rollback, the application version switching method provided by the embodiments of the present disclosure designs an application system deployment method, and the application system deployed in this way can perform a quick millisecond-level application version rollback even if the server is in a high concurrency status and the I/O load is very high. The application version switching method provided by the embodiments of the present disclosure can realize a millisecond-level rollback of the application system; it is not limited by rollback frequency and time point, and it can be rolled back to any version at any time for multiple times; it is not limited by the current state of the computer I/O system, and it can perform a quick application version rollback even in a status of the high concurrency and the high I/O.

Some embodiments of the present disclosure provide an application version switching apparatus, which can address the problem of efficiency in the switching of the application version to a certain extent.

Figure 3:
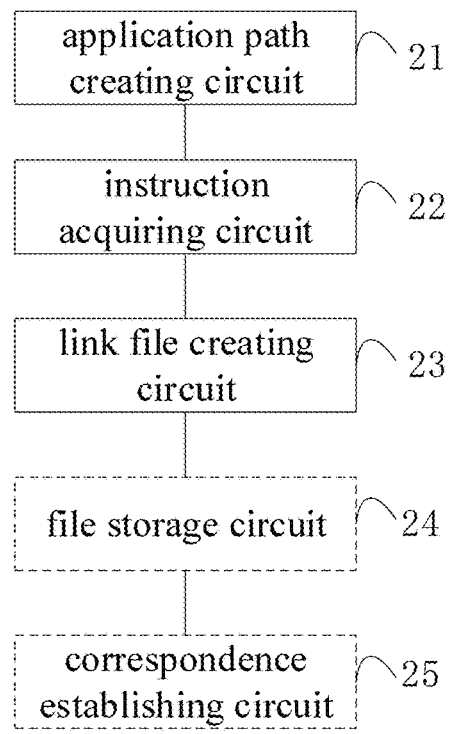
FIG. 3 is a structural schematic diagram of an application version switching apparatus provided according to an embodiment of the present disclosure.

As shown in FIG. 3, the application version switching apparatus comprises:

an application path creating circuit 21 configured to create storage paths for at least two versions of an application;

an instruction acquiring circuit 22 configured to acquire an application version switching instruction; and a link file creating circuit 23 configured to create a first link file for a currently used version of the application, wherein the first link file points to a storage path for the currently used version of the application; and if a storage path for a target switching version of the application exists, delete the first link file, and create a second link file for the target switching version of the application, wherein the second link file points to the storage path for the target switching version of the application.

It can be seen from the above embodiments that, according to the application version switching apparatus provided by the embodiments of the present disclosure, by creating a storage path for each of versions of an application, at the time of version switching, it is only needed to create a new link file to point to a storage path for the target switching version of the application, so as to quickly switch the version of the application; even if the server is in a high concurrency status and the I/O load is very high, a quick millisecond-level application version rollback can be performed; it is not limited by rollback frequency and time point, and it can be rolled back to any version at any time for multiple times.

According to some embodiments of the present disclosure, at least one of the first link file and the second link file is a soft link file.

According to some embodiments of the present disclosure, the application path creating circuit 21 is configured to create a storage path for each of the versions of the application by means of an application name plus a version identification, respectively.

According to some embodiments of the present disclosure, the link file creating circuit 23 is configured to name the first link file or the second link file with the application name, wherein a name of the first link file or the second link file is a storage path for the first link file or the second link file.

According to some embodiments of the present disclosure, the application version switching apparatus further comprises: a file storage circuit 24 configured to correspondingly store an executable program related to the application and a configuration file required by running the application, in the storage path for each of the versions of the application.

According to some embodiments of the present disclosure, the application version switching apparatus further comprises: a path correspondence establishing circuit 25 configured to establish, in a process of developing the application, a correspondence between the configuration file and a relative path, wherein the relative path is a storage path for the first link file or the second link file.

According to some embodiments of the present disclosure, in a process of running the application, a storage path for a log generated by the application is the relative path.

It should be noted that, the embodiments of the application version switching apparatus correspond to the embodiments of the application version switching method, and their corresponding technical effects are substantially the same as those of the embodiments of the application version switching method, and thus are not repeated herein.

Figure 4:
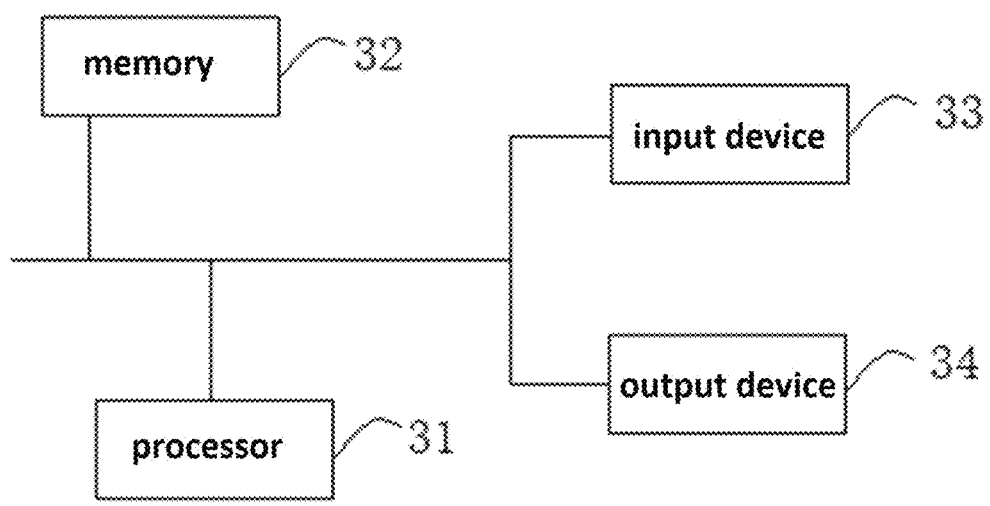
FIG. 4 is a structural schematic diagram of an apparatus for implementing the application version switching method provided according to an embodiment of the present disclosure.

Based on the above objective, some embodiments of the present disclosure provide an embodiment of an apparatus for performing the application version switching method. FIG. 4 is a schematic diagram of a hardware structure of an embodiment of an apparatus for performing the application version switching method provided by the present disclosure.

As shown in FIG. 4, the apparatus comprises:

one or more processors 31 and a memory 32. One processor 31 is illustrated in FIG. 4.

The apparatus for performing the application version switching method may further comprise: an input device 33 and an output device 34.

The processor 31, the memory 32, the input device 33 and the output device 34 may be connected by a bus or otherwise, and a bus connection is illustrated in FIG. 4.

The memory 32 is used as a non-volatile computer-readable storage medium, and can be used for storing non-volatile software programs, non-volatile computer-executable programs, and modules, such as program instructions/modules corresponding to the application version switching method in the embodiments of the present application (for example, the application path creating circuit 21, the instruction acquiring circuit 22, and the link file creating circuit 23 as shown in FIG. 3). The processor 31 executes various functional applications and data processing of the server by running nonvolatile software programs, instructions, and modules stored in the memory 32, to implement the application version switching method in the method embodiments.

The memory 32 may include a storage program area and a storage data area, wherein the storage program area may store an operating system, an application program required by at least one function; the storage data area may store data created according to the use of the application version switching apparatus, and the like. Further, the memory 32 may include a high-speed random access memory, and may also include a non-volatile memory, such as at least one magnetic disk storage device, a flash memory device, or another non-volatile solid-state storage device. In some embodiments, the memory 32 may optionally include memories located remotely from the processor 31, which may be connected to a member user behavior monitoring device over a network. Examples of the aforementioned network include, but are not limited to, the Internet, the intranet, the local area network, the mobile communication network, and combinations thereof.

The input device 33 may receive the input numeric or character information and generate key signal inputs related to user settings and function control of the application version switching apparatus. The output device 34 may include a display device such as a display screen.

The one or more modules are stored in the memory 32 and, when executed by the one or more processors 31, perform the application version switching method in any of the method embodiments described above. The technical effects of the embodiments of the apparatus for performing the application version switching method are the same as or similar to those of any of the above method embodiments.

The embodiments of the present application provide a non-transitory computer storage medium have stored therein computer-executable instructions that can execute the processing method in any of the above method embodiments. The technical effects of the embodiments of the non-transitory computer storage medium are the same as or similar to any of the above method embodiments.

Finally, it should be noted that, as understood by those skilled in the art, all or a portion of the processes in the methods of the embodiments described above may be implemented by instructing relevant hardware by a computer program, wherein the computer program may be stored in a computer-readable storage medium, and the computer program, when executed, may include the processes of the embodiments of the methods described above. The storage medium may be a magnetic disk, an optical disk, a Read-Only Memory (ROM), a Random Access Memory (RAM), or the like. The technical effects of the embodiments of the computer program are the same as or similar to those of any of the method embodiments described above.

Furthermore, the apparatus, the device, or the like described in the present disclosure may typically be various electronic terminal devices, such as a mobile phone, a Personal Digital Assistant (PDA), a tablet computer (PAD), a smart television, or the like; or may be a large terminal device, such as a server, and thus the scope of protection of the present disclosure should not be limited to a specific type of apparatus, device. The client according to the present disclosure may be applied to any of the above electronic terminal devices in the form of electronic hardware, computer software, or a combination of both.

Furthermore, the method according to the present disclosure may also be implemented as a computer program executed by a CPU, which may be stored in a computer-readable storage medium. The computer program, when executed by the CPU, performs the above-described functions defined in the method of the present disclosure.

Further, the above method steps and system units may also be implemented by using a controller and a computer readable storage medium for storing a computer program for causing the controller to implement the functions of the above steps or units.

Further, it should be appreciated that the computer-readable storage medium (e.g., memory) described herein can be either a volatile memory or a non-volatile memory, or can include both volatile memory and nonvolatile memory. By way of example and not limitation, the nonvolatile memory can include Read Only Memory (ROM), Programmable ROM (PROM), Electrically Programmable ROM (EPROM), Electrically Erasable Programmable ROM (EEPROM), or flash memory. The volatile memory can include Random Access Memory (RAM), which can act as an external cache memory. By way of example and not limitation, RAM is available in a variety of forms such as synchronous RAM (DRAM), Dynamic RAM (DRAM), Synchronous DRAM (SDRAM), double data rate SDRAM (DDR SDRAM), Enhanced SDRAM (ESDRAM), Synchronous Link DRAM (SLDRAM), and Direct Rambus RAM (DRRAM). The storage devices of the disclosed aspects are intended to comprise, but not limited to, these and other suitable types of memory.

Those skilled in the art would further appreciate that the various illustrative logical blocks, modules, circuits, and algorithm steps described in connection with the present disclosure herein may be implemented as electronic hardware, computer software, or a combination of both. To clearly illustrate this interchangeability of hardware and software, various illustrative components, blocks, modules, circuits, and steps have been described above generally in terms of their functionality. Whether such a functionality is implemented as software or hardware depends upon particular applications and design constraints imposed on the overall system. Those skilled in the art may implement the described functionality in various ways for each of the particular applications, but such implementation decisions should not be interpreted as causing a departure from the scope of the present disclosure.

The various illustrative logical blocks, modules, and circuits described in connection with the present disclosure herein may be implemented or performed with the following components designed to perform the functions described herein: a general purpose processor, a Digital Signal Processor (DSP), an Application Specific Integrated Circuit (ASIC), a Field Programmable Gate Array (FPGA) or another programmable logic device, a discrete gate or transistor logic, a discrete hardware component, or any combination of these components. The general purpose processor may be a microprocessor, but alternatively, the processor may be any traditional processor, controller, microcontroller, or state machine. The processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the present disclosure herein may be embodied directly in hardware, in a software module executed by the processor, or in a combination of both. The software module may reside in RAM memory, flash memory, ROM memory, EPROM memory, EEPROM memory, registers, hard disk, removable disk, CD-ROM, or any other form of storage medium known in the art. An exemplary storage medium is coupled to the processor such that the processor can read information from, and write information to, the storage medium. In an alternative, the storage medium may be integrated with the processor. The processor and the storage medium may reside in an ASIC. The ASIC may reside in a user terminal. In an alternative, the processor and the storage medium may reside as discrete components in the user terminal.

In one or more exemplary designs, the functions may be implemented in hardware, software, firmware, or any combination thereof. If implemented in software, the functions may be stored on or transmitted over the computer-readable medium as one or more instructions or codes. The computer-readable medium includes both computer storage medium and communication medium, wherein the communication medium includes any medium that facilitates transfer of a computer program from one place to another. The storage medium may be any available medium that can be accessed by a general purpose or special purpose computer. By way of examples and not limitation, such computer-readable medium can comprise RAM, ROM, EEPROM, CD-ROM or other optical disk storage device, magnetic disk storage device or other magnetic storage device, or may be any other medium that can be used to carry or store the desired program codes in the form of instruction or data structure and that can be accessed by the general purpose or special purpose computer, or a general purpose or special purpose processor. Also, any connection can be properly called a computer-readable medium. For example, if the software is transmitted from a website, a server, or other remote sources by using a coaxial cable, a fiber optic cable, a twisted pair, a Digital Subscriber Line (DSL), or wireless technologies such as infrared, radio, and microwave, then the coaxial cable, the fiber optic cable, the twisted pair, the DSL, or wireless technologies such as the infrared, the radio, and the microwave are included in the definition of the medium. Magnetic disk and optical disc, as used herein, include Compact Disc (CD), laser disc, optical disc, Digital Versatile Disc (DVD), floppy disk, Blu-ray disc, wherein the magnetic disk usually reproduces data magnetically, while the optical disc reproduces data optically with laser. Combinations of the above should also be included within the scope of the computer-readable medium.

The present disclosure discloses exemplary embodiments, but it should be noted that various changes and modifications could be made thereto without departing from the scope of the present disclosure as defined by the appended claims. It is not necessary to perform the functions, steps and/or actions of the method claims according to the embodiments of the present disclosure described herein in any particular order. Furthermore, although the element in the present disclosure may be described or claimed in a single form, a plural can be contemplated unless limitation to a single is explicitly stated.

It should be understood that, as used herein, the singular form "one" ("a", "an", "the") is intended to include the plural form as well, unless the context clearly supports the exception. It should also be understood that "and/or" as used herein is meant to include any and all possible combinations of one or more of the associated listed items.

The above-mentioned serial numbers of the embodiments of the present disclosure are merely for description, and do not represent advantages or disadvantages of the embodiments.

It will be understood by those skilled in the art that all or a portion of the steps for implementing the above embodiments may be implemented by hardware, or may be implemented by instructing relevant hardware by a program, wherein the program may be stored in a computer-readable storage medium, and the storage medium may be a read-only memory, a magnetic disk or an optical disk.

Those of ordinary skill in the art will understand that: the discussions of any of the embodiments above are exemplary only, and are not intended to imply that the scope of the present disclosure, including the claims, is limited to these examples; within the idea of the embodiments of the present disclosure, technical features in the above embodiments or different embodiments may also be combined, and there are many other variations of the different aspects of the embodiments of the present disclosure as described above, which are not provided in detail for the sake of brevity. Therefore, any omissions, modifications, equivalents, improvements, and the like that may be made without departing from the spirit and principle of the embodiments of the present disclosure are intended to be included within the protection scope of the embodiments of the present disclosure.

What is claimed is:

1. An application version switching method, comprising:
creating storage paths for at least two versions of an application;
creating a first link file for a currently used version of the application, wherein the first link file points to a storage path for the currently used version of the application;
acquiring an application version switching instruction;
in response to determining a storage path for a target switching version of the application exists, deleting the first link file, and creating a second link file for the target switching version of the application, wherein the second link file points to the storage path for the target switching version of the application;
in response to determining the storage path for the target switching version of the application does not exist, a process of the method is ended;
correspondingly storing an executable program related to the application and a configuration file required by running the application, in the storage path for each of the versions of the application, and establishing, in a process of developing the application, a correspondence between the configuration file and a relative path, wherein the relative path is a storage path for the first link file or the second link file, wherein the method further comprises:

creating a storage path for each of the versions of the application by means of an application name plus a version identification, respectively, and naming the first link file or the second link file with the application name, wherein a name of the first link file or the second link file is a storage path for the first link file or the second link file.

2. The method according to claim 1, wherein at least one of the first link file and the second link file is a soft link file.

3. The method according to claim 1, wherein in a process of running the application, a storage path for a log generated by the application is the relative path.

4. An application version switching apparatus, comprising:

an application path creating circuit configured to create storage paths for at least two versions of an application;

an instruction acquiring circuit configured to acquire an application version switching instruction;

a link file creating circuit configured to create a first link file for a currently used version of the application, wherein the first link file points to a storage path for the currently used version of the application; and in response to determining a storage path for a target switching version of the application exists, delete the first link file, and create a second link file for the target switching version of the application, wherein the second link file points to the storage path for the target switching version of the application;

a file storage circuit configured to correspondingly store an executable program related to the application and a configuration file required by running the application, in the storage path for each of the versions of the application, a path correspondence establishing circuit configured to establish, in a process of developing the application, a correspondence between the configuration file and a relative path, wherein the relative path is a storage path for the first link file or the second link file, wherein the application path creating circuit is configured to create a storage path for each of the versions of the application by means of an application name plus a version identification, respectively, wherein the link file creating circuit is configured to name the first link file or the second link file with the application name, wherein a name of the first link file or the second link file is a storage path for the first link file or the second link file, and wherein the link file creating circuit is further configured to, in response to determining the storage path for the target switching version of the application does not exist, end an application version switching process.

5. The apparatus according to claim 4, wherein at least one of the first link file and the second link file is a soft link file.

6. The apparatus according to claim 4, wherein in a process of running the application, a storage path for a log generated by the application is the relative path.

7. An electronic device, comprising:

at least one processor; and a memory communicatively coupled to the at least one processor; wherein, the memory stores therein instructions executable by the at least one processor, the instructions, when executed by the at least one processor, to cause the at least one processor to perform:

creating storage paths for at least two versions of an application;

creating a first link file for a currently used version of the application, wherein the first link file points to a storage path for the currently used version of the application;

acquiring an application version switching instruction;

in response to determining a storage path for a target switching version of the application exists, deleting the first link file, and creating a second link file for the target switching version of the application, wherein the second link file points to the storage path for the target switching version of the application;

in response to determining the storage path for the target switching version of the application does not exist, ending an application version switching process;

correspondingly storing an executable program related to the application and a configuration file required by running the application, in the storage path for each of the versions of the application, and establishing, in a process of developing the application, a correspondence between the configuration file and a relative path, wherein the relative path is a storage path for the first link file or the second link file, wherein the memory further stores therein instructions, when executed by the at least one processor, to cause the at least one processor to further perform create a storage path for each of the versions of the application by means of an application name plus a version identification, respectively, and name the first link file or the second link file with the application name, wherein a name of the first link file or the second link file is a storage path for the first link file or the second link file.

8. A non-transitory computer readable storage medium having a computer program stored therein, wherein the computer program, when executed by a processor, performs: the application version switching method according to claim 1.

* * * * *